US009304731B2

(12) United States Patent
Ansari et al.

(10) Patent No.: US 9,304,731 B2
(45) Date of Patent: Apr. 5, 2016

(54) TECHNIQUES FOR RATE GOVERNING OF A DISPLAY DATA STREAM

(75) Inventors: Nausheen Ansari, Folsom, CA (US); Todd M. Witter, Orangevale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,237

(22) PCT Filed: Dec. 21, 2011

(86) PCT No.: PCT/US2011/066550
§ 371 (c)(1),
(2), (4) Date: Jun. 16, 2014

(87) PCT Pub. No.: WO2013/095445
PCT Pub. Date: Jun. 27, 2013

(65) Prior Publication Data
US 2014/0297902 A1    Oct. 2, 2014

(51) Int. Cl.
*G06F 3/00* (2006.01)
*G06F 3/14* (2006.01)
*G09G 5/00* (2006.01)
*G06F 3/03* (2006.01)
*H04L 29/06* (2006.01)
*H04N 17/04* (2006.01)
*H04L 12/801* (2013.01)
*G06F 13/38* (2006.01)
*H04L 12/835* (2013.01)
*G09G 5/36* (2006.01)

(52) U.S. Cl.
CPC ............... *G06F 3/1423* (2013.01); *G06F 3/03* (2013.01); *G09G 5/00* (2013.01); *G09G 5/006* (2013.01); *H04L 29/06* (2013.01); *H04N 17/04* (2013.01); *G06F 13/385* (2013.01); *G09G 5/363* (2013.01); *G09G 2354/00* (2013.01); *G09G 2370/10* (2013.01); *G09G 2370/20* (2013.01); *H04L 47/10* (2013.01); *H04L 47/30* (2013.01)

(58) Field of Classification Search
None
See application file for complete search history.

(56) References Cited

U.S. PATENT DOCUMENTS 5,559,796 A * 9/1996 Edem et al. ................... 370/412
5,914,753 A    6/1999 Donovan
(Continued)

OTHER PUBLICATIONS

International Search Report and Written Opinion: Mailed date Sep. 25, 2012 from corresponding PCT/US2011/066550 filed date Dec. 21, 2011 (nine (9) pages).
(Continued)

*Primary Examiner* — Henry Tsai
*Assistant Examiner* — Aurangzeb Hassan
(74) *Attorney, Agent, or Firm* — Kacvinsky Daisak Bluni PLLC

(57) ABSTRACT

Techniques for rate governing of a display data stream are described. In one embodiment, for example, an apparatus may comprise a processor circuit and a graphics management module comprising a differential analyzer. In some embodiments, the graphics management module may be operative on the processor circuit to determine a target display data transmission rate for one or more displays, determine, by the differential analyzer, an actual display data transmission rate for one or more display data packets based on the target display data transmission rate, transmit the one or more display data packets based on the actual display data transmission rate, and accumulate a difference between the actual display data transmission rate and the target display data transmission rate for the one or more display data packets. Other embodiments are described and claimed.

26 Claims, 10 Drawing Sheets

(56) References Cited

U.S. PATENT DOCUMENTS

| | | | |
|---|---|---|---|
| 6,618,363 B1* | 9/2003 | Bahl | 370/329 |
| 7,543,073 B2 | 6/2009 | Chou et al. | |
| 8,738,860 B1* | 5/2014 | Griffin et al. | 711/122 |
| 2003/0072376 A1 | 4/2003 | Krishnamachari et al. | |
| 2004/0036708 A1 | 2/2004 | Evanicky et al. | |
| 2004/0196290 A1* | 10/2004 | Satoh | 345/505 |
| 2007/0005795 A1 | 1/2007 | Gonzalez | |
| 2010/0007677 A1 | 1/2010 | Kawaguchi | |

OTHER PUBLICATIONS

Office Action and Search Report received for Chinese Patent Application No. 201180075712.4, mailed Jun. 3, 2015, 27 pages including 18 pages English translation.

* cited by examiner

FIG. 8
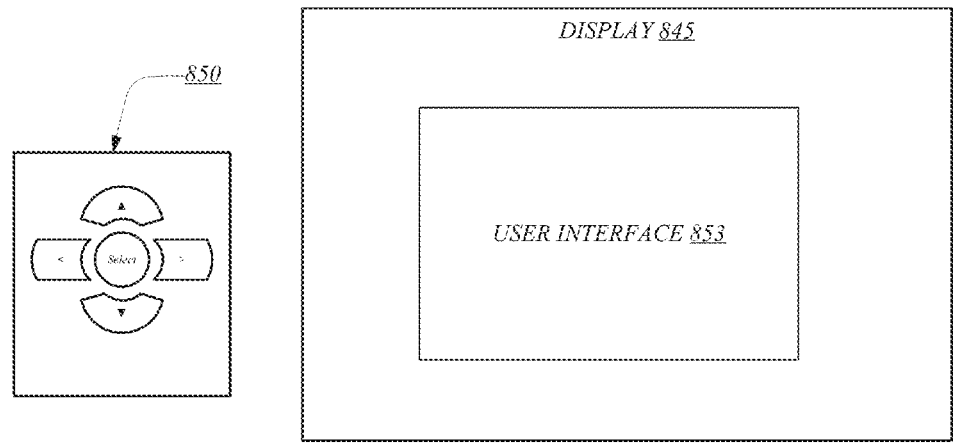
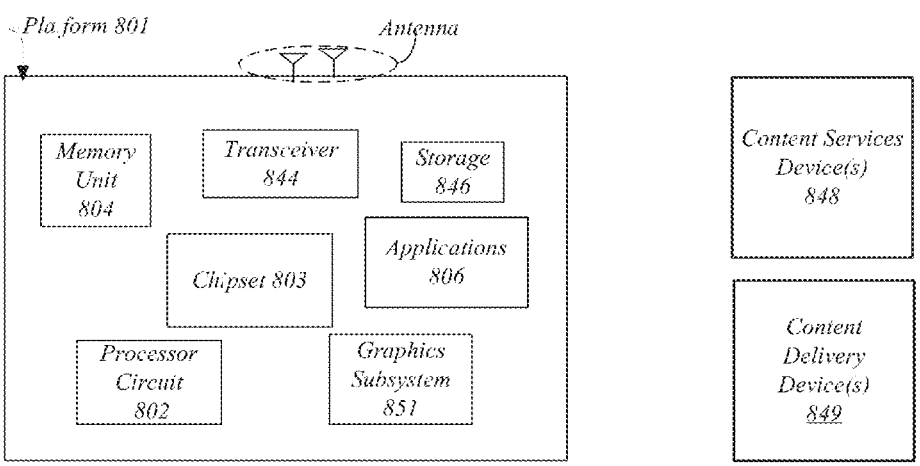

TECHNIQUES FOR RATE GOVERNING OF A DISPLAY DATA STREAM

BACKGROUND

In a computing system supporting packet-based transmission of display data, the actual transmission rate of display data within particular packets in a data stream may differ from a target rate at which one or more display devices consume the display data in the data stream. When the average actual transmission rate of a series of packets differs from the target rate, display corruption may result. Consequently, techniques for rate governing of a display data stream are described.

BRIEF DESCRIPTION OF THE DRAWINGS

FIG. 8 illustrates one embodiment of a third system.

DETAILED DESCRIPTION

Various embodiments may be generally directed to techniques for rate governing of a display data stream. In one embodiment, for example, an apparatus may comprise a processor circuit and a graphics management module, which may comprise a rate governing module containing a digital differential analyzer (DDA). The graphics management module may be operative on the processor circuit to determine a target display data transmission rate for one or more displays, determine, by the DDA, an actual display data transmission rate for one or more display data packets based on the target display data transmission rate, transmit the one or more display data packets based on the actual display data transmission rate, and accumulate a difference between the actual display data transmission rate and the target display data transmission rate for the one or more display data packets. In this manner, the techniques described herein may be operative to ensure an overall average transmission rate of display data that matches the consumption rate of that display data by one or more display devices. Ensuring that the overall average transmission rate matches the consumption rate may help to ensure that display data packets are properly processed upon receipt, and help to avoid potential display corruption. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Figure 1:
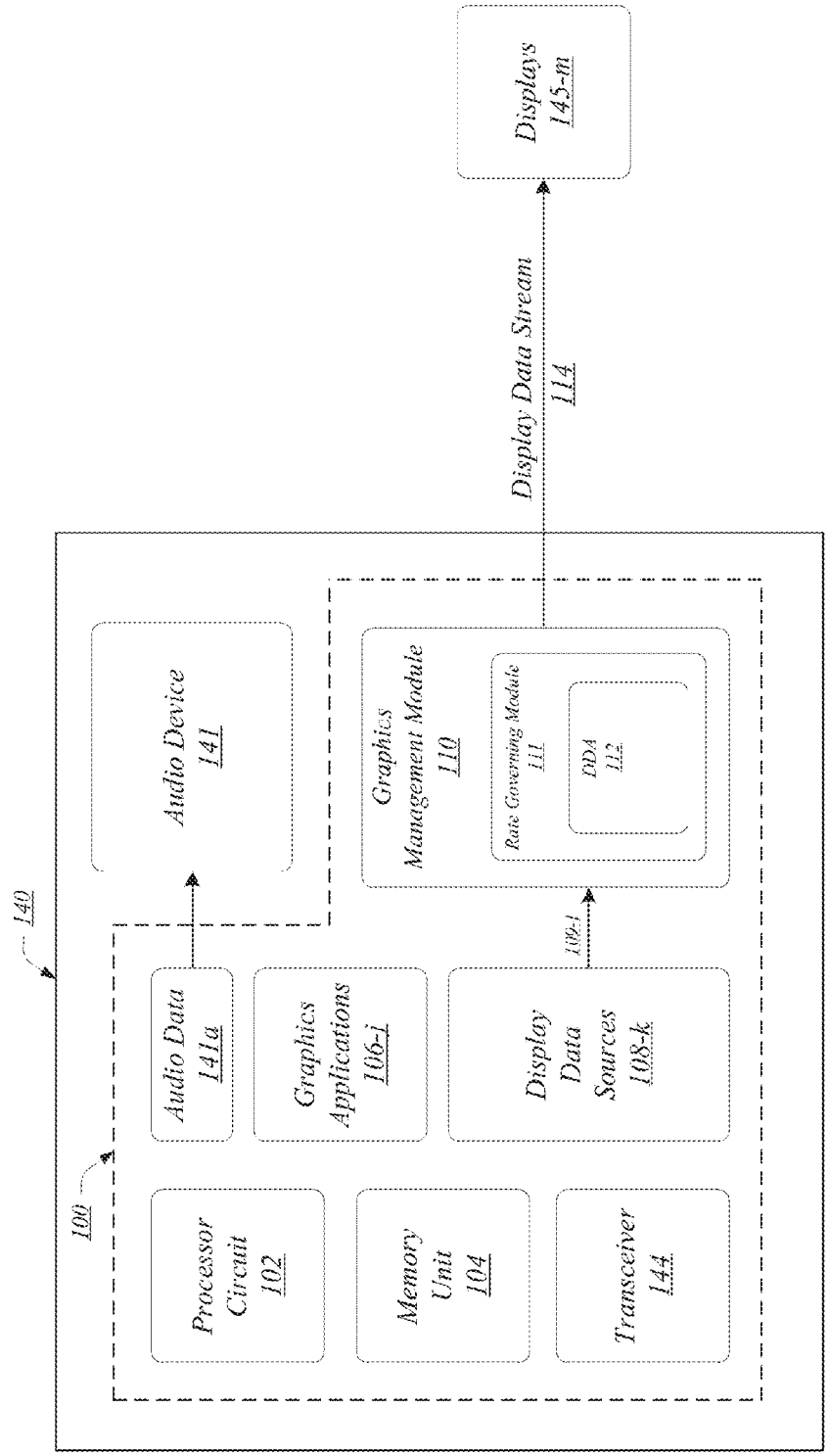
FIG. 1 illustrates one embodiment of a first apparatus and one embodiment of a first system.

FIG. 1 illustrates a block diagram of an apparatus 100. As shown in FIG. 1, apparatus 100 comprises multiple elements including a processor circuit 102, a memory unit 104, one or more graphics applications 106-$j$, one or more display data sources 108-$k$, a graphics management module 110, audio data 141$a$, and a transceiver 144. The embodiments, however, are not limited to the type, number, or arrangement of elements shown in this figure.

In various embodiments, apparatus 100 may comprise processor circuit 102. Processor circuit 102 may be implemented using any processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). Processor circuit 102 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 102 may be implemented as a general purpose processor, such as a processor made by Intel® Corporation, Santa Clara, Calif. The embodiments are not limited in this context.

In some embodiments, apparatus 100 may comprise a memory unit 104. Memory unit 104 may be implemented using any machine-readable or computer-readable media capable of storing data, including both volatile and non-volatile memory. For example, memory unit 104 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory unit 104 may be included on the same integrated circuit as processor circuit 102, or alternatively some portion or all of memory unit 104 may be disposed on an integrated circuit or other medium, for example a hard disk drive, that is external to the integrated circuit of processor circuit 102. In some embodiments, the machine-readable or computer-readable medium may comprise a non-transitory medium. The embodiments are not limited in this context.

In various embodiments, apparatus 100 may comprise one or more graphics applications 106-$j$. It is worthy to note that "j" and similar designators as used herein are intended to be variables representing any positive integer. Thus, for example, if an implementation sets a value for j=5, then a complete set of graphics applications 106-$j$ may include graphics applications 106-1, 106-2, 106-3, 106-4 and 106-5. The embodiments are not limited in this context.

Graphics applications 106-*j* may comprise any application(s) featuring graphics capabilities, such as, for example, an image or video viewing application, an image or video playback application, a streaming video playback application, a multimedia application program, a system program, a conferencing application, a gaming application, a productivity application, a messaging application, an instant messaging (IM) application, an electronic mail (email) application, a short messaging service (SMS) application, a multimedia messaging service (MMS) application, a social networking application, a web browsing application, and so forth. The embodiments are not limited in this context.

In some embodiments, apparatus 100 may comprise one or more display data sources 108-*k*, each of which may comprise any combination of hardware and/or software capable of generating display data. Display data may comprise any data, information, or logic usable by one or more displays to render any visual and/or optical sensory effect(s), such as, for example, images, pictures, video, text, graphics, menus, textures, and/or patterns. In various such embodiments, display data may comprise a plurality of display data symbols, and each display data symbol may comprise a fundamental unit of display data. For example, display data may comprise a plurality of display data symbols each representing an 8-bit character according to International Organization for Standardization/International Electrotechnical Commission (ISO/IEC) standard 8859-1, "Information technology—8-bit single-byte coded graphic character sets—Part 1: Latin alphabet No. 1" (1998). In some of these embodiments, a display data symbol may be an atomic or the smallest unit of display data that one or more displays are capable of understanding and processing. In various embodiments, one or more of display data sources 108-*k* may comprise programming logic, code, or instructions within one or more of graphics applications 106-*j*. One or more of display data sources 108-*k* may also comprise other hardware or software components of apparatus 100. The embodiments are not limited in this context.

In various embodiments, apparatus 100 may comprise a graphics management module 110. Graphics management module 110 may comprise a graphics port controller in various embodiments. Examples of graphics management module 110 may include but are not limited to a graphics port controller microchip or card, graphics port controller circuitry integrated into a multi-purpose microchip or card, and a graphics port controller implemented as software. In some embodiments, graphics management module 110 may comprise graphics port controller circuitry integrated into processor unit 102. Graphics management module 110 may receive display data from display data sources 108-*k* in one or more display data source streams 109-*l*. In some embodiments, there may be as many display data source streams 109-*l* as there are display data sources 108-*k*. The embodiments are not limited in this respect.

In some embodiments, graphics management module 110 may comprise a rate governing module 111. Rate governing module 111 may comprise any combination of hardware and/or software capable of performing rate governing operations for graphics management module 110. Graphics management module 110 may use rate governing operations performed by rate governing module 111 to form a display data stream 114. Display data stream 114 may comprise display data from the one or more display data source streams 109-*l*. Rate governing module 111 may comprise a logical circuit including one or more logic gates and/or logic devices, as well as programming logic, instructions, algorithms, and/or code operative to set, initialize, and/or modify states and/or values associated with the one or more logic gates and/or logic devices. The embodiments are not limited in this context.

In various embodiments, rate governing module 111 may comprise digital differential analyzer (DDA) 112. DDA 112 may comprise any logic device capable of continually receiving and summing or integrating input data. In various embodiments, DDA 112 may include an accumulator and be operative to store intermediate results produced by performing summing or integrating operations on received inputs. In some embodiments, DDA 112 may be communicatively coupled with one or more logic gates and/or logic devices in rate governing module 111 to form a logical circuit that performs rate governing operations. The embodiments are not limited in this context.

In some embodiments, apparatus 100 may comprise a transceiver 144. Transceiver 144 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 144 may operate in accordance with one or more applicable standards in any version. The embodiments are not limited in this context.

In various embodiments, apparatus 100 may be arranged to communicatively couple with one or more displays 145-*m*. Display(s) 145-*m* may comprise any device(s) capable of displaying display data received from apparatus 100 or from any other suitable device. Examples for display(s) 145-*m* may include a television, a monitor, a projector, and a computer screen. In one embodiment, for example, display(s) 145-*m* may be implemented by liquid crystal display (LCD) displays, light emitting diode (LED) displays, or other types of suitable visual interfaces. Display(s) 145-*m* may comprise, for example, touch-sensitive color display screens. In various implementations, display(s) 145-*m* may comprise one or more thin-film transistors (TFT) LCD including embedded transistors. The embodiments are not limited in this context.

In some embodiments, displays 145-*m* may be arranged to receive data from and/or transmit data to apparatus 100 and/or system 140 over a wired connection, a wireless connection, or a combination of both. In some embodiments, one or more of displays 145-*m* may comprise transceivers, and apparatus 100 and/or system 140 may implement wireless connections with those displays via their corresponding transceivers, using transceiver 144. In one embodiment, apparatus 100 and/or system 140 may be implemented in an electronic device that includes one or more of displays 145-*m* integrated into a single electronic device. Alternatively, apparatus 100 and/or system 140 and displays 145-*m* may be implemented in separate electronic devices. The embodiments are not limited in this context.

FIG. 1 may also illustrate a block diagram of a system 140 in various embodiments. System 140 may comprise any of the aforementioned elements of apparatus 100. System 140 may further comprise an audio device 141 in some embodiments. Audio device 141 may comprise any device capable of generating tones, music, speech, speech utterances, sound effects, background noise, or other sounds based on received audio data. Examples of audio device 141 may include a speaker, a multi-speaker system, a home entertainment system, a television, a consumer appliance, a computer system, a mobile device, and a portable electronic media device, among other examples.

In various embodiments, audio device 141 may be arranged to generate tones, music, speech, speech utterances, sound effects, background noise, or other sounds based on audio data 141a received from apparatus 100, and produced by one or more of graphics applications 106-j, and/or one or more other elements of apparatus 100. In some embodiments, audio data 141a may be associated with display data generated by one or more of display data sources 108-k. For example, display data generated by one or more of display data source 108-k may comprise a video, and audio data 141a may comprise audio tracks corresponding to the video. The embodiments are not limited in this context.

In general operation, apparatus 100 and/or system 140 may be operative to form display data stream 114 by receiving, combining, and performing rate governing operations on one or more display data source streams 109-l. In various embodiments, display data stream 114 may comprise a display data packet stream. In some such embodiments, the display data packet stream may be formed in accordance with one or more applicable standards. For example, in some embodiments, the display data packet stream may comply with Video Electronics Standards Association (VESA) DisplayPort™ Standard Version 1, Revision 2, adopted Jan. 5, 2010. The embodiments are not limited in this context.

Figure 2A:
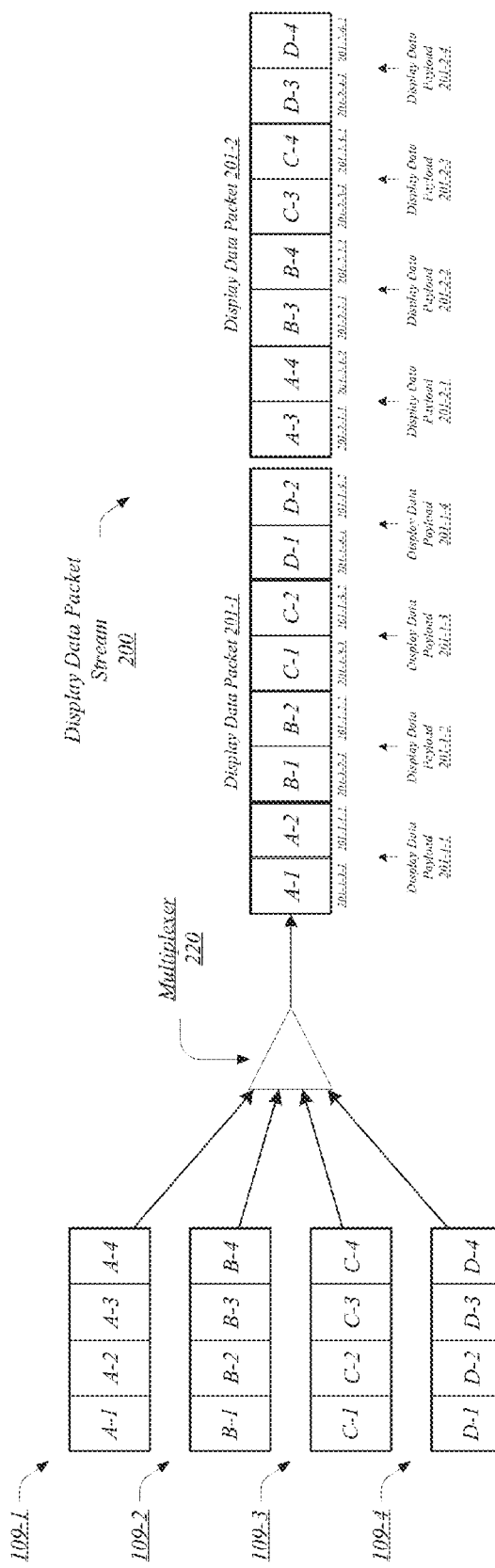
FIG. 2A illustrates a first embodiment of a packet stream.

FIG. 2A illustrates one embodiment of a display data packet stream 200. Display data packet stream 200 may be representative of, for example, display data stream 114 as described with reference to FIG. 1. Display data packet stream 200 may be used to transmit display data corresponding to one or more display data source streams 109-l in a single data stream. Using display data packet stream 200 to transmit display data corresponding to more than one display data source stream 109-l may allow the use of one outgoing data connection to transmit data received over multiple incoming data connections, and may reduce the structural and bandwidth requirements for transmission of display data to displays 145-m. The embodiments are not limited in this context.

Display data packet stream 200 may comprise a series of display data packets 201-p, each comprising one or more display data payloads 201-p-q containing display data. For example, display data packet stream 200 in FIG. 2A comprises display data packets 201-1 and 201-2. Display data packet 201-1 comprises display data payloads 201-1-1, 201-1-2, 201-1-3, and 201-1-4, and display data packet 201-2 comprises display data payloads 201-2-1, 201-2-2, 201-2-3, and 201-2-4. In some embodiments, the display data may be in the form of a plurality of display data elements and each display data element may comprise a portion of the display data. For example, display data may be in the form of display data symbols, and each data element may comprise one of those display data symbols.

In some embodiments, each display data packet 201-p may be subdivided into a plurality of slots, and one or more of the slots may comprise display data slots 201-p-q-r. Display data slots 201-p-q-r may comprise slots that are designated to contain display data. Each display data payload 201-p-q in a display data packet 201-p may comprise one or more of the display data slots 201-p-q-r in the display data packet 201-p. In various embodiments, each display data slot 201-p-q-r may contain a display data element, and thus the amount of display data in each display data packet 201-p and/or display data payload 201-p-q may correspond to a number of display data slots 201-p-q-r in each display data packet 201-p and/or display data payload 201-p-q. For example, each display data payload 201-p-q in FIG. 2A comprises two display data slots 201-p-q-1 and 201-p-q-2. In the particular example of display data payload 201-1-1, display data slots 201-1-1-1 and 201-1-1-2 comprise display data elements A-1 and A-2, respectively. Thus display data payload 201-1-1, as well as each other display data payload 201-p-q in FIG. 2A comprises two display data slots 201-p-q-r and two display data elements that fill those slots. The embodiments are not limited to these examples.

In some embodiments, particular display data packets 201-p in a display data packet stream 200 may comprise display data elements originating from more than one display data source, and the display data elements originating from the multiple display data sources may be multiplexed or otherwise combined into the particular display data packets 201-p. In various such embodiments, each of the display data payloads 201-p-q in a particular display data packet 201-p may correspond to display data elements of a particular display data source stream 109-l. In some of these embodiments, the display data packets 201-p may each comprise a number of display data payloads 201-p-q equal to the number of display data source streams 109-l, and each display data payload 201-p-q may comprise display data corresponding to a different one of the display data source streams 109-l. For example, FIG. 2A illustrates four display data source streams 109-1, 109-2, 109-3, and 109-4, and also illustrates that both display data packet 201-1 and display data packet 201-2 comprise one display data payload 201-p-q for each display data source stream 109-l, and each of the display data payloads 201-p-q comprises two display data elements from the display data source stream 109-l to which that display data payload 201-p-q corresponds. In the particular example of display data packet 201-1, display data payload 201-1-1 corresponds to display data source stream 109-1, and display data slots 201-1-1-1 and 201-1-1-2 comprise display data elements A-1 and A-2, which are display data elements from display data source stream 109-1. It is worthwhile to note that although FIG. 2A illustrates the display data elements in display data source streams 109-l being combined into display data packet stream 200 using multiplexer 220, other methods of performing these operations are both possible and contemplated, and the embodiments are not limited in this context.

In some embodiments, a series of display data packets 201-p may comprise one or more display data transmission lanes 202-s. Each transmission lane 202-s may comprise a logical construct including a subset of the display data payloads 202-s-t in the series of display data packets 201-p. Transmission lanes 202-s may all be associated with a single display data packet stream 200 transmitted over a single communications connection or line. In other words, transmission lanes 202-s may comprise logical subdivisions of the payloads 202-s-t transmitted in the display data packet stream 200, rather than comprising separate data streams transmitted over separate communications connections or lines. The embodiments are not limited in this context.

Figure 2B:
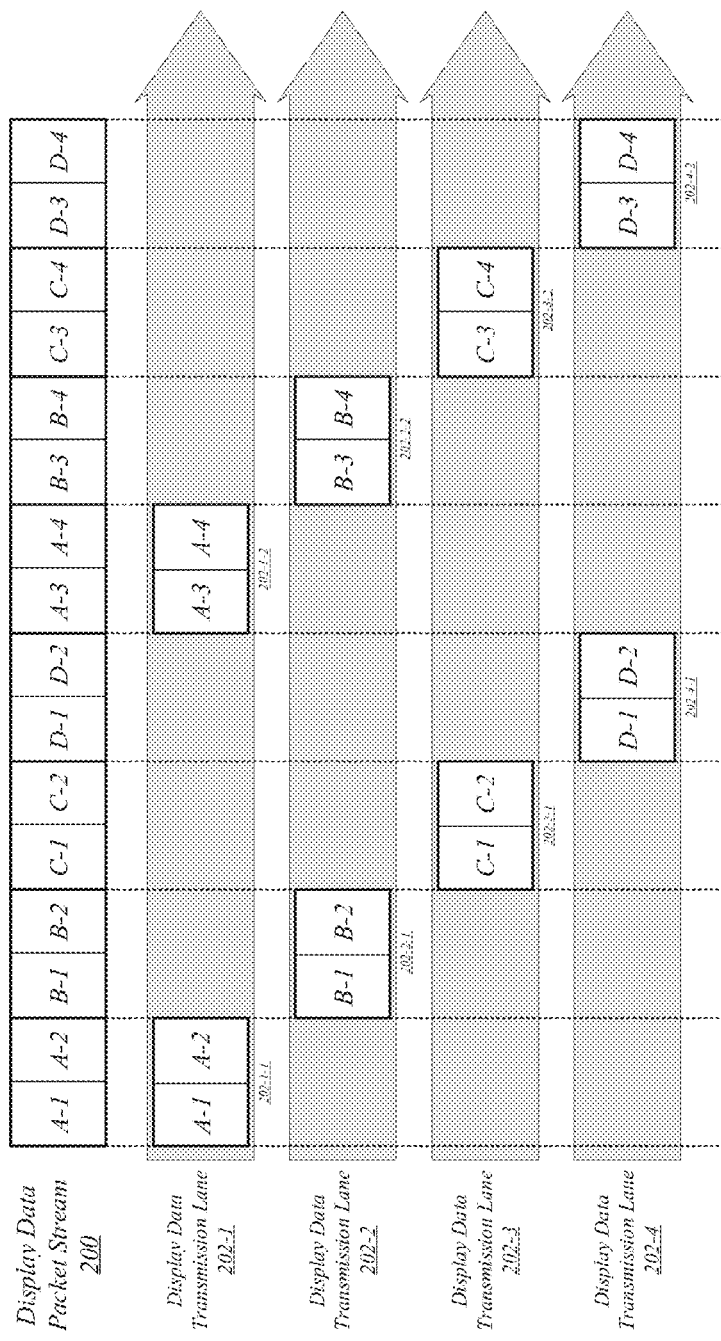
FIG. 2B illustrates a second embodiment of a packet stream.

FIG. 2B illustrates an embodiment of display data packet stream 200 that comprises four display data transmission lanes 202-s. Each of display data transmission lanes 202-s comprises a series of display data payloads 202-s-t within the display data packets 201-p of display data packet stream 200, where each display data payload 202-s-t in any particular series corresponds to the same display data source stream 109-l. For example, display data transmission lane 202-1 comprises display data payloads 202-1-1 and 202-1-2, which both correspond to display data source stream 109-1. For illustrative purposes, the transmission lanes 202-s in FIG. 2B are shown using four separate flow arrows. However, as noted above, transmission lanes 202-s may comprise logical subdivisions of the payloads 202-s-t of a single display data packet stream 200 transmitted over a single communications connection or line. The embodiments are not limited in this context.

In various embodiments, each display data packet 201-p may comprise a number of display data slots 201-p-q-r, and each display data slot 201-p-q-r may comprise a single display data element. In such embodiments, a transmission of a display data packet 201-p may be regarded as a transmission of that number of display data slots 201-p-q-r, and also as transmission of that number of display data elements. In a subset of such embodiments, the number of display data slots 201-p-q-r per display data packet 201-p may be constrained to integer values, due to related constraints of the system. For example, in embodiments in which each display data element comprises a single display data symbol, and each display data symbol represents a fundamental unit of display data such that it cannot be subdivided into portions of display data that a display can understand and process individually, the number of display data slots 201-p-q-r per display data packet 201-p may be constrained to integer values representing the number of display data symbols per display data packet 201-p. The embodiments are not limited in this context.

Figure 3:
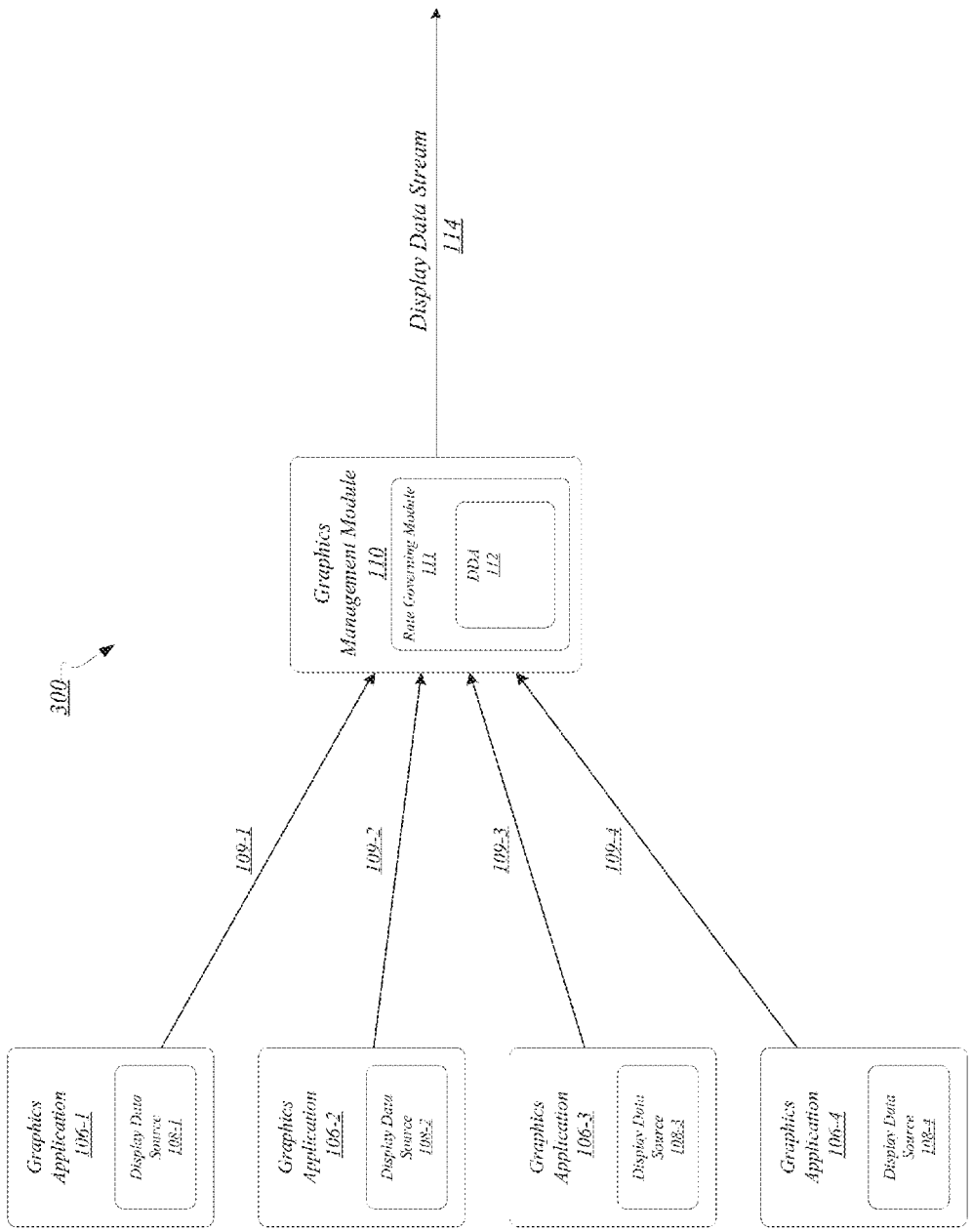
FIG. 3 illustrates one embodiment of a second apparatus.

FIG. 3 illustrates the manner in which graphics management module may form display data stream 114 in some embodiments of apparatus 100 and/or system 140. In FIG. 3, each of four graphics applications 106-j comprises a corresponding display data source 108-k. In turn, each display data source 108-k produces a corresponding display data source stream 109-l. Graphics management module 110 receives display data source streams 109-l, and processes them to form and transmit display data stream 114. The embodiments are not limited to this example.

In some embodiments, display data packets 201-p may be transmitted according to an actual display data transmission rate. The actual display data transmission rate for a particular display data packet 201-p may indicate the number of display data slots 201-p-q-r comprised within that display data packet 201-p. In embodiments in which each display data slot 201-p-q-r comprises one display data element, the actual display data transmission rate for a particular display data packet 201-p will also indicate the number of display data elements in that particular display data packet 201-p. In embodiments in which the number of display data slots 201-p-q-r per display data packet 201-p is constrained to integer values, the actual display data transmission rate will likewise be constrained to integer values. The embodiments are not limited in this context.

In various embodiments, the transmission of display data packets 201-p to one or more displays may need to comply with one or more constraints of the one or more displays 145-m or of other components of the system. For example, one or more displays 145-m may be subject to constraints on the rate at which they can consume display data. In some such embodiments, one or more displays 145-m may need to consume display data at a particular average display data consumption rate. This constraint may be determined by available refresh rates of displays 145-m, or by other limitations associated with other hardware and/or software components of apparatus 100 and/or system 140. A target display data transmission rate for display data packets 201-p in a display data packet stream 200 may be determined based on such an average display data consumption rate for the particular displays to which the display data packets 201-p correspond.

The target display data transmission rate for particular display data packets 201-p may indicate the average number of display data slots 201-p-q-r that the display data packets 201-p should comprise. In embodiments in which each display data slot 201-p-q-r comprises one display data element, the target display data transmission rate may indicate the average number of display data elements per display data packet 201-p. The embodiments are not limited in this context.

In some embodiments, particular display data packets 201-p may be transmitted at actual display data transmission rates that are not equal to the target display data transmission rate for the particular displays to which those display data packets 201-p correspond. In various such embodiments, the numbers of display data slots 201-p-q-r in a series of display data packets 201-p may be determined such that although the actual display data transmission rates of each of the display data packets 201-p are not equal to the target display data transmission rate, the average display data transmission rate of the display data packets 201-p in the series is equal to the target display data transmission rate. For example, if four consecutive display data packets 201-p are transmitted that each comprise a number of display data slots 201-p-q-r that is less than the target display data transmission rate, a fifth display data packet 201-p may subsequently be transmitted that comprises a number of display data slots 201-p-q-r that is greater than the target display data transmission rate, such that the average of the numbers of display data slots 201-p-q-r in the five display data packets 201-p is equal to the target display data transmission rate. The embodiments are not limited in this context.

In various embodiments, differences between the actual display data transmission rates for particular display data packets 201-p and the target display data transmission rate corresponding to those particular display data packets 201-p may be due to constraints on the numbers of display data slots 201-p-q-r that each display data packet 201-p may comprise. For example and as noted above, in some embodiments, each display data slot 201-p-q-r may comprise a single display data element, and each display data element may comprise a single display data symbol. Each display data symbol may in turn comprise a fundamental unit of display data such that it cannot be subdivided into portions of display data that a display can understand and process individually, and thus the actual display data transmission rates may be constrained to integer values corresponding to integer numbers of display data symbols. In some such embodiments in which an actual display data transmission rate for a display data packet 201-p is constrained to integer values, the target display data transmission rate corresponding to that display data packet 201-p may comprise a non-integer value. The embodiments are not limited in this context.

In some embodiments, the actual display data transmission rates for a series of display data packets 201-p may be determined based on the target display data transmission rate corresponding to those display data packets 201-p. In some such embodiments, the target display data transmission rate may comprise an integer display data slot quantity and a fractional display data slot quantity. The fractional display data slot quantity may comprise any non-negative number that is less than one, and the sum of the integer display data slot quantity and the fractional display data slot quantity may be equal to the average number of display data slots 201-p-q-r that should appear in a single display data packet 201-p, according to the target display data transmission rate. For example, a target display data transmission rate equal to 34.25 slots/packet may comprise an integer display data slot quantity equal to 34 slots and a fractional display data slot quantity equal to 0.25 slots. The embodiments are not limited to this example.

In various embodiments, in order to achieve an overall average number of display data slots 201-*p-q-r* per transmitted display data packet 201-*p*, the transmitted display data packets 201-*p* may be constructed such that a portion of the display data packets 201-*p* ("the large display data packets") each comprise a number of display data slots 201-*p-q-r* that is greater than the target display data transmission rate, and the remaining display data packets 201-*p* ("the small display data packets") each comprise a number of display data slots 201-*p-q-r* that is less than the target display data transmission rate. In some such embodiments, the small display data packets may comprise a number of display data slots 201-*p-q-r* equal to the integer display data slot quantity, and the large display data packets may comprise a number of display data slots 201-*p-q-r* equal to an allocated slot quantity. The allocated slot quantity may represent a total number of slots 201-*p-q-r* within each display data packet 201-*p* for which graphics management module 110 must determine values, and may comprise the sum of the integer display data slot quantity and a positive integer, such as 1. The allocated slot quantity may thus be determined based on the target display data transmission rate, since the allocated slot quantity is determined by the integer display data slot quantity, and the integer display data slot quantity is determined by the target display data transmission rate. In such embodiments, the relative number of large display data packets relative to small display data packets may be proportional to the fractional display data slot quantity. For example, when the fractional display data slot quantity is closer to 1, there may be a greater number of large display data packets the display data packet stream 200 relative to small display data packets in the display data packet stream 200 than there are when the fractional display data slot quantity is closer to 0.

In some embodiments, rate governing module 111 may receive from DDA 112, for each display data packet in a series of display data packets 201-*p*, the actual display data transmission rate to be used for that display data packet 201-*p*, which may define the number of display data slots 201-*p-q-r* to be included in that display data packet 201-*p*. DDA 112 may be arranged in combination with other components of rate governing module 111 to generate or determine actual display data transmission rates such that over all the display data packets 201-*p* in the series, the number of display data slots 201-*p-q-r* per display data packet 201-*p* averages out to the target display data transmission rate. In various such embodiments, each actual display data transmission rate generated or determined by DDA 112 may be equal to either the integer display data slot quantity or the allocated slot quantity, in such proportion as causes the average number of display data slots 201-*p-q-r* per display data packet 201-*p* in the series to equal the target display data transmission rate. For example, in an embodiment in which the target display data transmission rate is equal to 34.5 slots, the integer display data slot quantity is equal to 34 slots, and the allocated slot quantity is equal to 35 slots, DDA 112 may generate or determine an actual display data transmission rate equal to 34 for half of the display data packets 201-*p* in a display data packet stream 200, and generate or determine an actual display data transmission rate equal to 35 for the remaining half of the display data packets 201-*p* in the display data packet stream 200. The embodiments are not limited to this example.

In various embodiments, processor circuit 102 may determine the target display data transmission rate and pass it to rate governing module 111. Rate governing module 111 may receive and store the target display data transmission rate. Subsequently, each time DDA 112 generates an actual display data transmission rate, rate governing module 111 may accumulate a difference between that actual display data transmission rate and the target display data transmission rate. In some such embodiments, rate governing module 111 may set a DDA slot counter equal to the actual display data transmission rate and add the allocated slot quantity to a rate governing slot counter, and the accumulated difference between the actual display data transmission rates and the target display data transmission rate may be reflected by the difference between these two counters. In some embodiments, when the accumulated difference between the actual display data transmission rates and the target display data transmission rate is greater than or equal to 1 prior to the transmission of a particular display data packet 201-*p*, rate governing module 111 may instruct graphics management module 110 to transmit one or more rate governing symbols in one or more display data slots 201-*p-q-r* of that particular display data packet 201-*p*. In various such embodiments, rate governing module 111 may determine whether the accumulated difference between the actual display data transmission rates and the target display data transmission rate is greater than or equal to one by decrementing the DDA slot counter by one and decrementing the rate governing slot counter by one each time it instructs graphics management module 110 to fill a display data slot 201-*p-q-r* in the display data packet 201-*p* with display data. Rate governing module 111 may determine that the accumulated difference between the actual display data transmission rates and the target display data transmission rate is greater than or equal to one when the DDA slot counter is equal to zero and the rate governing slot counter is greater than or equal to one. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
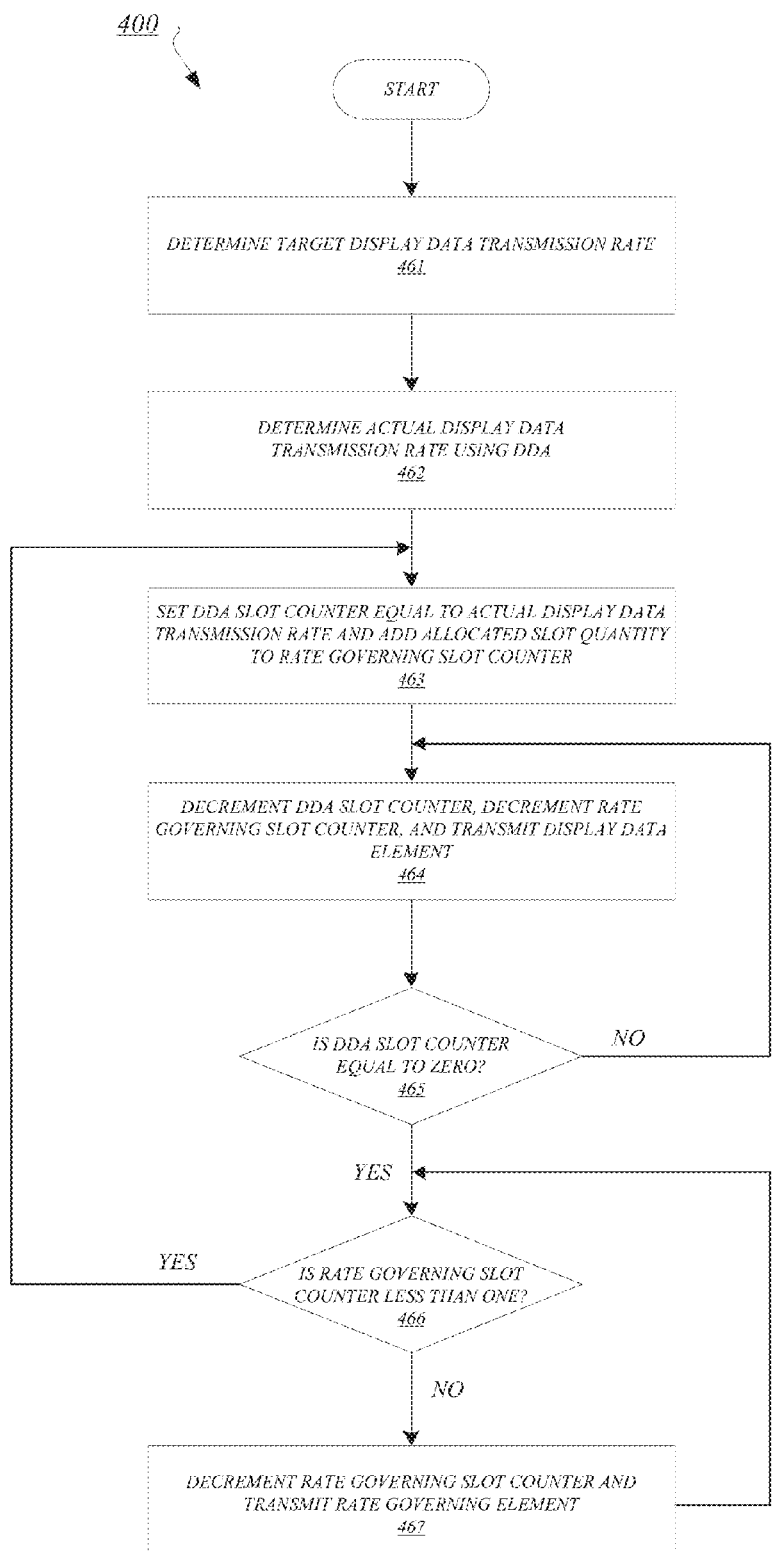
FIG. 4 illustrates one embodiment of a logic flow.

FIG. 4 illustrates one embodiment of a logic flow 400, which may be representative of the operations executed by one or more embodiments described herein. As shown in logic flow 400, a target display data transmission rate may be determined at block 461. For example, processor circuit 102 of FIG. 1 may determine a target display data transmission rate. At block 462, an actual display data transmission rate may be determined using a DDA. For example, rate governing module 111 of FIG. 1 may determine an actual display data transmission rate using DDA 112. At block 463, a DDA slot counter may be set equal to the actual display data transmission rate and the allocated slot quantity may be added to the rate governing slot counter. For example, rate governing module 111 of FIG. 1 may set the DDA slot counter equal to the actual display data transmission rate, and add the allocated slot quantity to the rate governing slot counter.

At block 464, the DDA slot counter and the rate governing slot counter may both be decremented, and a display data element may be transmitted. For example, rate governing module 111 of FIG. 1 may decrement the DDA slot counter and the rate governing slot counter, and cause apparatus 100 and/or system 140 to transmit a display data element. At block 465, it may be determined whether the DDA slot counter is equal to zero. For example, rate governing module 111 of FIG. 1 may determine whether the DDA slot counter is equal to zero. If it is determined that the DDA slot counter is not equal to zero, control may pass back to block 464. Alternatively, if it is determined that the DDA slot counter is equal to zero, control may pass to block 466.

At block 466, it may be determined whether the rate governing slot counter is greater than or equal to one. For example, rate governing module 111 of FIG. 1 may determine whether the rate governing slot counter is greater than or equal to one. If it is determined that the rate governing slot counter is less than one, control may pass back to block 463. Alternatively, if it is determined that the rate governing slot counter is greater than or equal to one, control may pass to block 467. At block 467, the rate governing slot counter may be decremented, and a rate governing element may be transmitted, and control may then pass back to block 466. For example, rate governing module 111 of FIG. 1 may decrement the rate governing slot counter and cause apparatus 100 and/or system 140 to transmit a rate governing element, and control may then pass back to block 466. The embodiments are not limited to these examples.

Figure 5A:
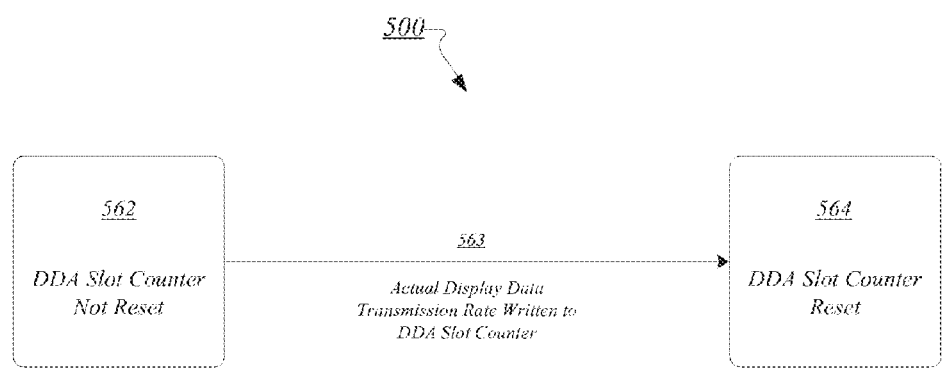
FIG. 5A illustrates one embodiment of a first state diagram.

FIG. 5A comprises a state diagram 500, which illustrates an example of a change to the state of the DDA slot counter that may occur prior to transmission of a display data packet. At block 562, the DDA slot counter may be in a non-reset state, such that it does not comprise an appropriate value for beginning transmission of the display data packet. For example, rate governing module 111 of FIG. 1 may have decremented the DDA slot counter to a value of zero during transmission of a previous display data packet, and the DDA slot counter may still comprise that value of zero. At transition 563, an actual display data transmission rate may be written to the DDA slot counter. For example, rate governing module 111 of FIG. 1 may write an actual display data transmission rate to the DDA slot counter. At block 564, the DDA slot counter may be in a reset state. For example, rate governing module 111 of FIG. 1 may have written an actual display data transmission rate into the DDA slot counter. The embodiments are not limited to these examples.

Figure 5B:
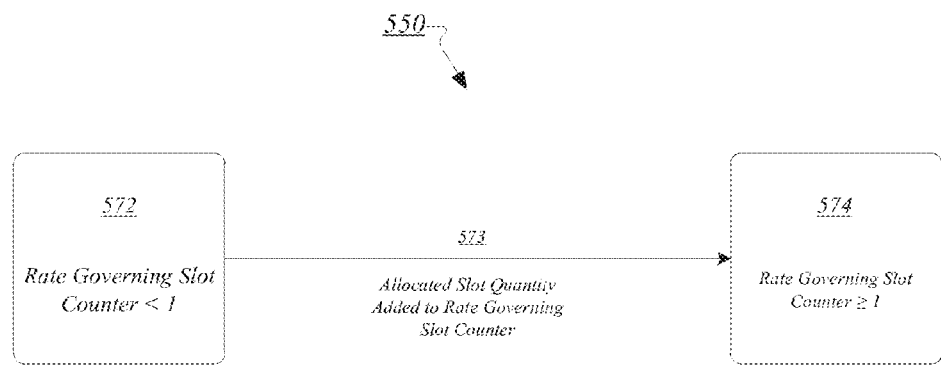
FIG. 5B illustrates one embodiment of a second state diagram.

FIG. 5B comprises a state diagram 550, which illustrates an example of a change to the state of the rate governing slot counter that may occur prior to transmission of a display data packet. At block 572, the rate governing slot counter may comprise a value that is less than one. For example, rate governing module 111 of FIG. 1 may have decremented the rate governing slot counter to a value that is less than one during transmission of a previous display data packet, and the rate governing slot counter may still comprise that value that is less than one. At transition 573, an allocated slot value may be added to the rate governing slot counter. For example, rate governing module 111 of FIG. 1 may add the allocated slot value to the rate governing slot counter. At block 574, the rate governing slot counter may comprise a value that is greater than or equal to one. For example, rate governing module 111 of FIG. 1 may have added the allocated slot value to the previous value in the rate governing slot counter, and the sum of these values may be greater than or equal to one. The embodiments are not limited to these examples.

Figure 6:
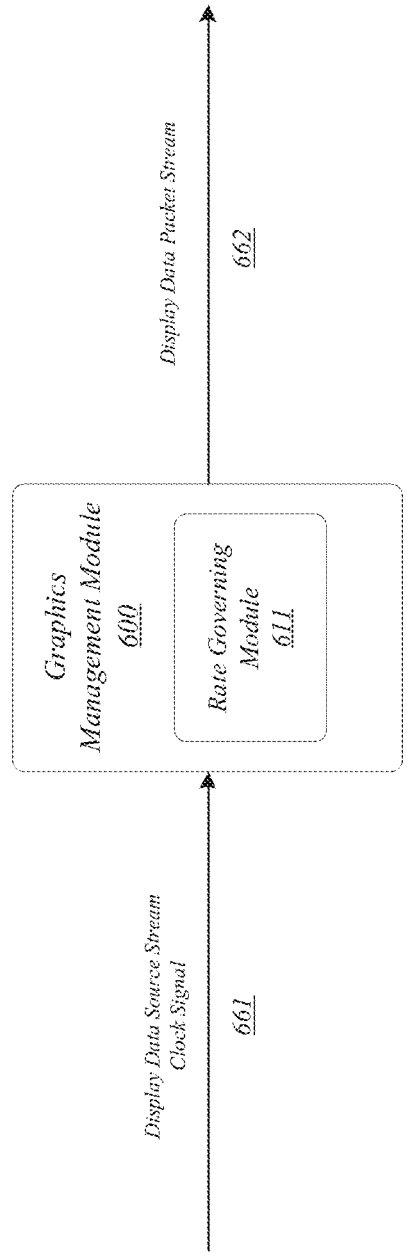
FIG. 6 illustrates one embodiment of third apparatus.

FIG. 6 illustrates an embodiment of a graphics management module 600. In various embodiments, graphics management module 600 may be representative of a system or architecture suitable for use with one or more embodiments described herein, such as apparatus 100 and/or system 140 of FIG. 1, display data packet stream 200 of FIGS. 2A and 2B, logic flow 400 of FIG. 4, or state diagrams 500 and 550 of FIGS. 5A and 5B. Graphics management module 600 may receive a display data source stream clock signal 661 corresponding to display data source streams 109-l. Display data source stream clock signal 661 may define a first data rate that differs from a display data consumption rate of one or more displays. Graphics management module 600 may transmit a display data packet stream 662. Transmission of display data packet stream 662 may comprise transmitting display data at a second data rate that differs from the first data rate, and matches the display data consumption rate of the one or more displays. The embodiments are not limited in this context.

Figure 7:
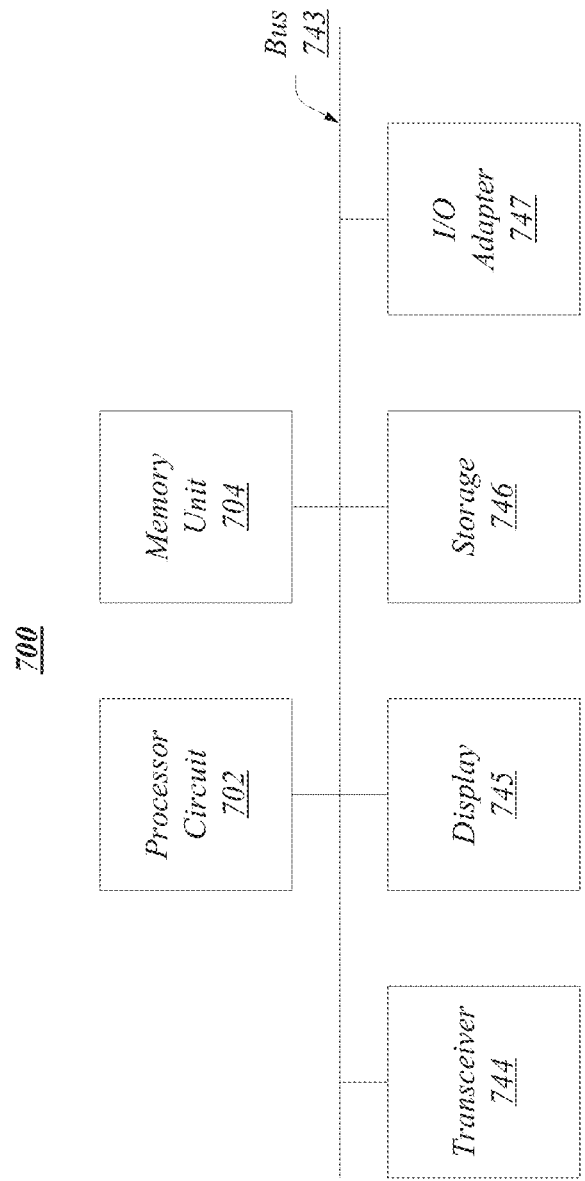
FIG. 7 illustrates one embodiment of a second system.

FIG. 7 illustrates one embodiment of a system 700. In various embodiments, system 700 may be representative of a system or architecture suitable for use with one or more embodiments described herein, such as apparatus 100 and/or system 140 of FIG. 1, display data packet stream 200 of FIGS. 2A and 2B, logic flow 400 of FIG. 4, or state diagrams 500 and 550 of FIGS. 5A and 5B. The embodiments are not limited in this respect.

As shown in FIG. 7, system 700 may comprise multiple elements. One or more elements may be implemented using one or more circuits, components, registers, processors, software subroutines, modules, or any combination thereof, as desired for a given set of design or performance constraints. Although FIG. 7 shows a limited number of elements in a certain topology by way of example, it can be appreciated that more or less elements in any suitable topology may be used in system 700 as desired for a given implementation. The embodiments are not limited in this context.

In various embodiments, system 700 may include a processor circuit 702. Processor circuit 702 may be implemented using any processor or logic device, and may be the same as or similar to processor circuit 102 of FIG. 1.

In one embodiment, system 700 may include a memory unit 704 to couple to processor circuit 702. Memory unit 704 may be coupled to processor circuit 702 via communications bus 743, or by a dedicated communications bus between processor circuit 702 and memory unit 704, as desired for a given implementation. Memory unit 704 may be implemented using any machine-readable or computer-readable media capable of storing data, including both volatile and non-volatile memory and may be the same as or similar to memory unit 104 of FIG. 1.

In various embodiments, system 700 may include a transceiver 744. Transceiver 744 may include one or more radios capable of transmitting and receiving signals using various suitable wireless communications techniques, and may be the same as or similar to transceiver 144 of FIG. 1. Such techniques may involve communications across one or more wireless networks. In communicating across such networks, transceiver 744 may operate in accordance with one or more applicable standards in any version. The embodiments are not limited in this context.

In various embodiments, system 700 may include a display 745. Display 745 may comprise any television type monitor or display. Display 745 may comprise any display device capable of displaying information received from processor circuit 702, and may be the same as or similar to displays 145-m of FIG. 1. The embodiments are not limited in this context.

In various embodiments, system 700 may include storage 746. Storage 746 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 746 may comprise technology to increase the storage performance enhanced protection for valuable digital media when multiple hard drives are included, for example. Further examples of storage 746 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, system 700 may include one or more I/O adapters 747. Examples of I/O adapters 747 may include Universal Serial Bus (USB) ports/adapters, IEEE 1394 Firewire ports/adapters, and so forth. The embodiments are not limited in this context.

FIG. 8 illustrates an embodiment of a system 800. In various embodiments, system 800 may be representative of a system or architecture suitable for use with one or more embodiments described herein, such as apparatus 100 and/or system 140 of FIG. 1, display data packet stream 200 of FIGS. 2A and 2B, logic flow 400 of FIG. 4, state diagrams 500 and 550 of FIGS. 5A and 5B, or system 700 of FIG. 7. The embodiments are not limited in this respect.

As shown in FIG. 8, system 800 may comprise multiple elements. One or more elements may be implemented using one or more circuits, components, registers, processors, software subroutines, modules, or any combination thereof, as desired for a given set of design or performance constraints. Although FIG. 8 shows a limited number of elements in a certain topology by way of example, it can be appreciated that more or less elements in any suitable topology may be used in system 800 as desired for a given implementation. The embodiments are not limited in this context.

In embodiments, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 800 comprises a platform 801 coupled to a display 845. Platform 801 may receive content from a content device such as content services device(s) 848 or content delivery device(s) 849 or other similar content sources. A navigation controller 850 comprising one or more navigation features may be used to interact with, for example, platform 801 and/or display 845. Each of these components is described in more detail below.

In embodiments, platform 801 may comprise any combination of a processor circuit 802, chipset 803, memory unit 804, transceiver 844, storage 846, applications 851, and/or graphics subsystem 852. Chipset 803 may provide intercommunication among processor circuit 802, memory unit 804, transceiver 844, storage 846, applications 851, and/or graphics subsystem 852. For example, chipset 803 may include a storage adapter (not depicted) capable of providing intercommunication with storage 846.

Processor circuit 802 may be implemented using any processor or logic device, and may be the same as or similar to processor circuit 102 in FIG. 1.

Memory unit 804 may be implemented using any machine-readable or computer-readable media capable of storing data, and may be the same as or similar to memory unit 104 in FIG. 1.

Transceiver 844 may include one or more radios capable of transmitting and receiving signals using various suitable wireless communications techniques, and may be the same as or similar to transceiver 144 in FIG. 1.

Display 845 may comprise any television type monitor or display, and may be the same as or similar to display 145-*m* in FIG. 1.

Storage 846 may be implemented as a non-volatile storage device, and may be the same as or similar to storage 746 in FIG. 7.

Graphics subsystem 852 may perform processing of images such as still or video for display. Graphics subsystem 852 may be a graphics processing unit (GPU) or a visual processing unit (VPU), for example. An analog or digital interface may be used to communicatively couple graphics subsystem 852 and display 845. For example, the interface may be any of a High-Definition Multimedia Interface, DisplayPort, wireless HDMI, and/or wireless HD compliant techniques. Graphics subsystem 852 could be integrated into processor circuit 802 or chipset 803. Graphics subsystem 852 could be a stand-alone card communicatively coupled to chipset 803.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 848 may be hosted by any national, international and/or independent service and thus accessible to platform 801 via the Internet, for example. Content services device(s) 848 may be coupled to platform 801 and/or to display 845. Platform 801 and/or content services device(s) 848 may be coupled to a network 853 to communicate (e.g., send and/or receive) media information to and from network 853. Content delivery device(s) 849 also may be coupled to platform 801 and/or to display 845.

In embodiments, content services device(s) 848 may comprise a cable television box, personal computer, network, telephone, Internet enabled devices or appliance capable of delivering digital information and/or content, and any other similar device capable of unidirectionally or bidirectionally communicating content between content providers and platform 801 and/display 845, via network 853 or directly. It will be appreciated that the content may be communicated unidirectionally and/or bidirectionally to and from any one of the components in system 800 and a content provider via network 853. Examples of content may include any media information including, for example, video, music, medical and gaming information, and so forth.

Content services device(s) 848 receives content such as cable television programming including media information, digital information, and/or other content. Examples of content providers may include any cable or satellite television or radio or Internet content providers. The provided examples are not meant to limit embodiments of the invention.

In embodiments, platform 801 may receive control signals from navigation controller 850 having one or more navigation features. The navigation features of navigation controller 850 may be used to interact with a user interface 854, for example. In embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 850 may be echoed on a display (e.g., display 845) by movements of a pointer, cursor, focus ring, or other visual indicators displayed on the display. For example, under the control of software applications 851, the navigation features located on navigation controller 850 may be mapped to virtual navigation features displayed on user interface 854. In embodiments, navigation controller 850 may not be a separate component but integrated into platform 801 and/or display 845. Embodiments, however, are not limited to the elements or in the context shown or described herein.

In embodiments, drivers (not shown) may comprise technology to enable users to instantly turn on and off platform 801 like a television with the touch of a button after initial boot-up, when enabled, for example. Program logic may allow platform 801 to stream content to media adaptors or other content services device(s) 848 or content delivery device(s) 849 when the platform is turned "off." In addition, chip set 803 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 800 may be integrated. For example, platform 801 and content services device(s) 848 may be integrated, or platform 801 and content delivery device(s) 849 may be integrated, or platform 801, content services device(s) 848, and content delivery device(s) 849 may be integrated, for example. In various embodiments, platform 801 and display 845 may be an integrated unit. Display 845 and content service device(s) 848 may be integrated, or display 845 and content delivery device(s) 849 may be integrated, for example. These examples are not meant to limit the invention.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 801 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
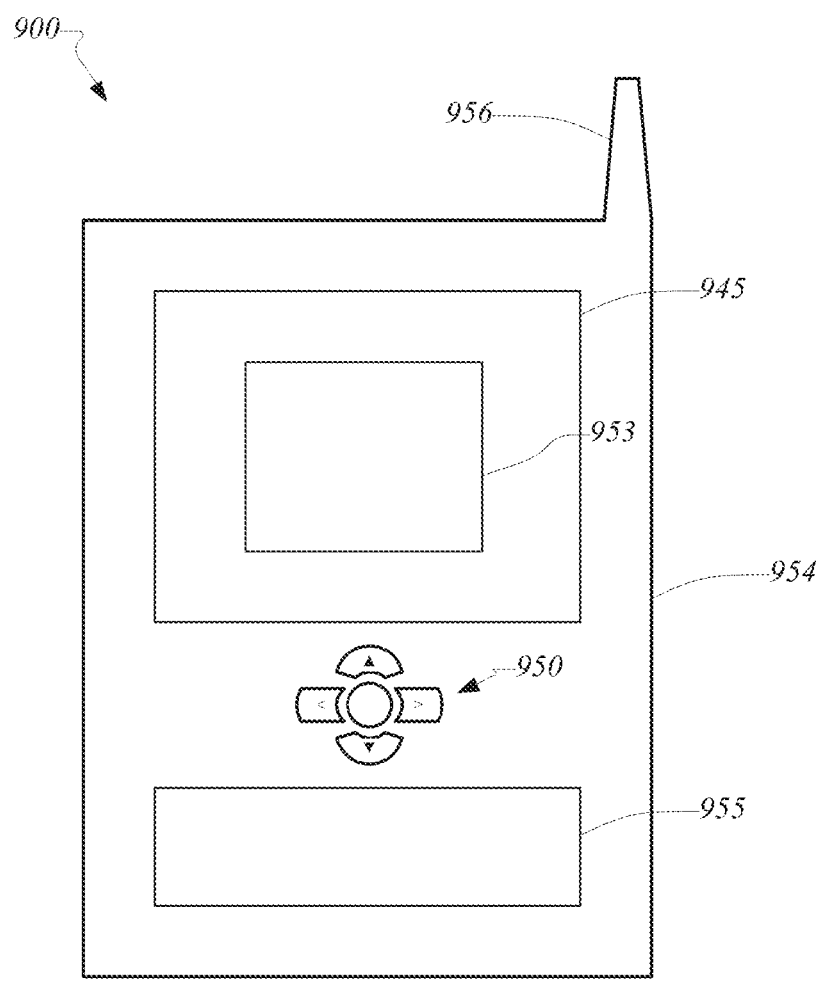
FIG. 9 illustrates one embodiment of a device.

As described above, system 800 may be embodied in varying physical styles or form factors. FIG. 9 illustrates embodiments of a small form factor device 900 in which system 800 may be embodied. In embodiments, for example, device 900 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a display 945, a navigation controller 950, a user interface 954, a housing 955, an I/O device 956, and an antenna 957. Display 945 may comprise any suitable display unit for displaying information appropriate for a mobile computing device, and may be the same as or similar to display 845 in FIG. 8. Navigation controller 950 may comprise one or more navigation features which may be used to interact with user interface 954, and may be the same as or similar to navigation controller 850 in FIG. 10. I/O device 956 may comprise any suitable I/O device for entering information into a mobile computing device. Examples for I/O device 956 may include an alphanumeric keyboard, a numeric keypad, a touch pad, input keys, buttons, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. .sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
determining, by a processor circuit, a target display data transmission rate for one or more displays;

generating, by a digital differential analyzer (DDA) communicatively coupled to the processor circuit, an actual display data transmission rate for one or more display data packets based on the target display data transmission rate;

transmitting the one or more display data packets based on the actual display data transmission rate;

accumulating a difference between the actual display data transmission rate and the target display data transmission rate for the one or more display data packets, the display data packets comprising a display data packet stream, the display data packet stream comprising one or more display data transmission lanes;

receiving one or more display data source streams; and processing the one or more display data source streams to form the display data packet stream, each of the one or more display data transmission lanes in the display data packet stream corresponding to a different one of the one or more display data source streams.

2. The method of claim 1, comprising:

determining an allocated slot quantity based on the target display data transmission rate; and generating the actual display data transmission rate based on the allocated slot quantity.

3. The method of claim 2, the transmission of each of the one or more display data packets comprising:

adding the allocated slot quantity to a rate governing slot counter; and setting a DDA slot counter equal to the actual display data transmission rate.

4. The method of claim 3, the transmission of each of the one or more display data packets comprising:

in an iterative loop, transmitting a next display data element comprised within a next display data slot in the display data packet, decrementing the DDA slot counter by one, and decrementing the rate governing slot counter by one, until the DDA slot counter is equal to zero; and when the rate governing slot counter is not less than one, iteratively transmitting a rate governing data element and decrementing the rate governing slot counter by one, until the rate governing slot counter is less than one.

5. The method of claim 1, the target display data transmission rate determined based on a number of display data transmission lanes in the display data packet stream.

6. The method of claim 1, each of the one or more display data packets comprising at least one display data payload for each of the one or more display data transmission lanes.

7. The method of claim 1, the one or more display data source streams received at a first data rate defined by a display data source stream clock signal, the first data rate differing from a display data consumption rate of the one or more displays.

8. The method of claim 7, comprising transmitting the display data packet stream at a second data rate that differs from the first data rate and matches the display data consumption rate of the one or more displays.

9. An article comprising a non-transitory computer-readable storage medium containing instructions that when executed by a processor cause a computing system to:

determine a target display data transmission rate for one or more displays;

determine, by a digital differential analyzer (DDA), an actual display data transmission rate for one or more display data packets based on the target display data transmission rate;

monitor transmission of the one or more display data packets based on the actual display data transmission rate, the transmission of each of the one or more display data packets comprising:

in an iterative loop, transmitting a next display data element comprised within a next display data slot in the display data packet, decrementing the DDA slot counter by one, and decrementing the rate governing slot counter by one, until the DDA slot counter is equal to zero; and when the rate governing slot counter is not less than one, iteratively transmitting a rate governing data element and decrementing the rate governing slot counter by one, until the rate governing slot counter is less than one; and accumulate a difference between the actual display data transmission rate and the target display data transmission rate for the one or more display data packets.

10. The article of claim 9, the non-transitory computer-readable storage medium containing instructions that when executed cause the computing system to: determine an allocated slot quantity based on the target display data transmission rate; and generate the actual display data transmission rate based on the allocated slot quantity.

11. The article of claim 10, the transmission of each of the one or more display data packets comprising:

adding the allocated slot quantity to a rate governing slot counter; and setting a DDA slot counter equal to the actual display data transmission rate.

12. The article of claim 9, the one or more display data packets comprising a display data packet stream, the display data packet stream comprising one or more display data transmission lanes, the target display data transmission rate determined based on a number of display data transmission lanes in the display data packet stream.

13. The article of claim 12, each of the one or more display data packets comprising at least one display data payload for each of the one or more display data transmission lanes.

14. The article of claim 13, the non-transitory computer-readable storage medium containing instructions that when executed cause the computing system to: receive one or more display data source streams at a first data rate defined by a display data source stream clock signal, the first data rate differing from a display data consumption rate of the one or more displays; process the one or more display data source streams to form the display data packet stream, each of the one or more display data transmission lanes in the display data packet stream corresponding to a different one of the one or more display data source streams; and monitor transmission of the display data packet stream at a second data rate that differs from the first data rate and matches the display data consumption rate of the one or more displays.

15. An apparatus, comprising:

a processor circuit; and a graphics management module comprising a digital differential analyzer (DDA), the graphics management module operative on the processor circuit to:

determine a target display data transmission rate for one or more displays;

generate, by the DDA, an actual display data transmission rate for one or more display data packets based on the target display data transmission rate;

transmit the one or more display data packets based on the actual display data transmission rate, the transmission of each of the one or more display data packets comprising:

in an iterative loop, transmitting a next display data element comprised within a next display data slot in the display data packet, decrementing the DDA slot counter by one, and decrementing the rate governing slot counter by one, until the DDA slot counter is equal to zero; and when the rate governing slot counter is not less than one, iteratively transmitting a rate governing data element and decrementing the rate governing slot counter by one, until the rate governing slot counter is less than one; and accumulate a difference between the actual display data transmission rate and the target display data transmission rate for the one or more display data packets.

16. The apparatus of claim 15, the graphics management module operative on the processor circuit to:

determine an allocated slot quantity based on the target display data transmission rate; and generate the actual display data transmission rate based on the allocated slot quantity.

17. The apparatus of claim 16, the transmission of each of the one or more display data packets comprising:

adding the allocated slot quantity to a rate governing slot counter; and setting a DDA slot counter equal to the actual display data transmission rate.

18. The apparatus of claim 15, the one or more display data packets comprising a display data packet stream, the display data packet stream comprising one or more display data transmission lanes, the target display data transmission rate determined based on a number of display data transmission lanes in the display data packet stream.

19. The apparatus of claim 18, each of the one or more display data packets comprising at least one display data payload for each of the one or more display data transmission lanes.

20. The apparatus of claim 19, the graphics management module operative on the processor circuit to:

receive one or more display data source streams at a first data rate defined by a display data source stream clock signal, the first data rate differing from a display data consumption rate of the one or more displays;

process the one or more display data source streams to form the display data packet stream, each of the one or more display data transmission lanes in the display data packet stream corresponding to a different one of the one or more display data source streams; and transmit the display data packet stream at a second data rate that differs from the first data rate and matches the display data consumption rate of the one or more displays.

21. A system, comprising:

a processor circuit;

an audio device communicatively coupled to the processor circuit; and a graphics management module comprising a digital differential analyzer (DDA), the graphics management module operative on the processor circuit to:

determine a target display data transmission rate for one or more displays;

generate, by the DDA, an actual display data transmission rate for one or more display data packets based on the target display data transmission rate;

transmit the one or more display data packets based on the actual display data transmission rate;

accumulate a difference between the actual display data transmission rate and the target display data transmission rate for the one or more display data packets;

receive one or more display data source streams at a first data rate defined by a display data source stream clock signal, the first data rate differing from a display data consumption rate of the one or more displays;

process the one or more display data source streams to form the display data packet stream, each of the one or more display data transmission lanes in the display data packet stream corresponding to a different one of the one or more display data source streams; and transmit the display data packet stream at a second data rate that differs from the first data rate and matches the display data consumption rate of the one or more displays.

22. The system of claim 21, the graphics management module operative on the processor circuit to:

determine an allocated slot quantity based on the target display data transmission rate; and generate the actual display data transmission rate based on the allocated slot quantity.

23. The system of claim 22, the transmission of each of the one or more display data packets comprising:

adding the allocated slot quantity to a rate governing slot counter; and setting a DDA slot counter equal to the actual display data transmission rate.

24. The system of claim 23, the transmission of each of the one or more display data packets comprising:

in an iterative loop, transmitting a next display data element comprised within a next display data slot in the display data packet, decrementing the DDA slot counter by one, and decrementing the rate governing slot counter by one, until the DDA slot counter is equal to zero; and when the rate governing slot counter is not less than one, iteratively transmitting a rate governing data element and decrementing the rate governing slot counter by one, until the rate governing slot counter is less than one.

25. The system of claim 21, the one or more display data packets comprising a display data packet stream, the display data packet stream comprising one or more display data transmission lanes, the target display data transmission rate determined based on a number of display data transmission lanes in the display data packet stream.

26. The system of claim 25, each of the one or more display data packets comprising at least one display data payload for each of the one or more display data transmission lanes.

* * * * *